E. CHILDS.
COTTON HARVESTER.
APPLICATION FILED NOV. 30, 1908.
949,260.
Patented Feb. 15, 1910.
3 SHEETS—SHEET 1.
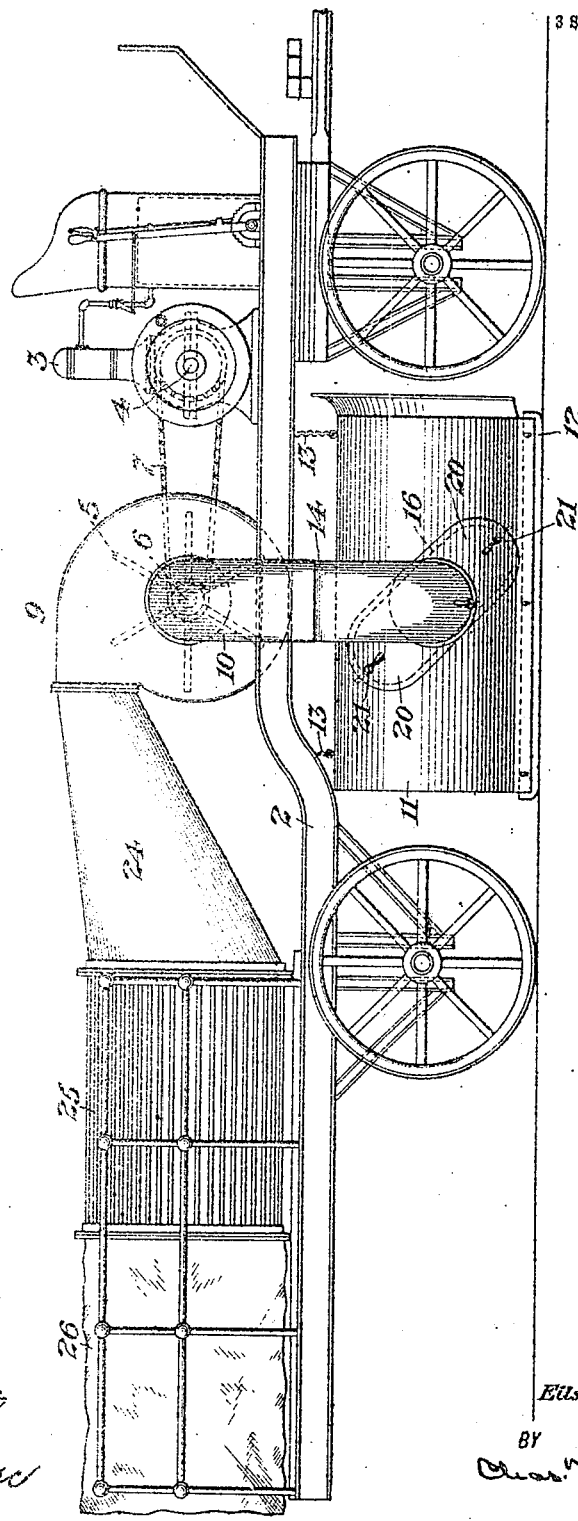
WITNESSES
INVENTOR
Ellsworth Childs
BY
ATTORNEY

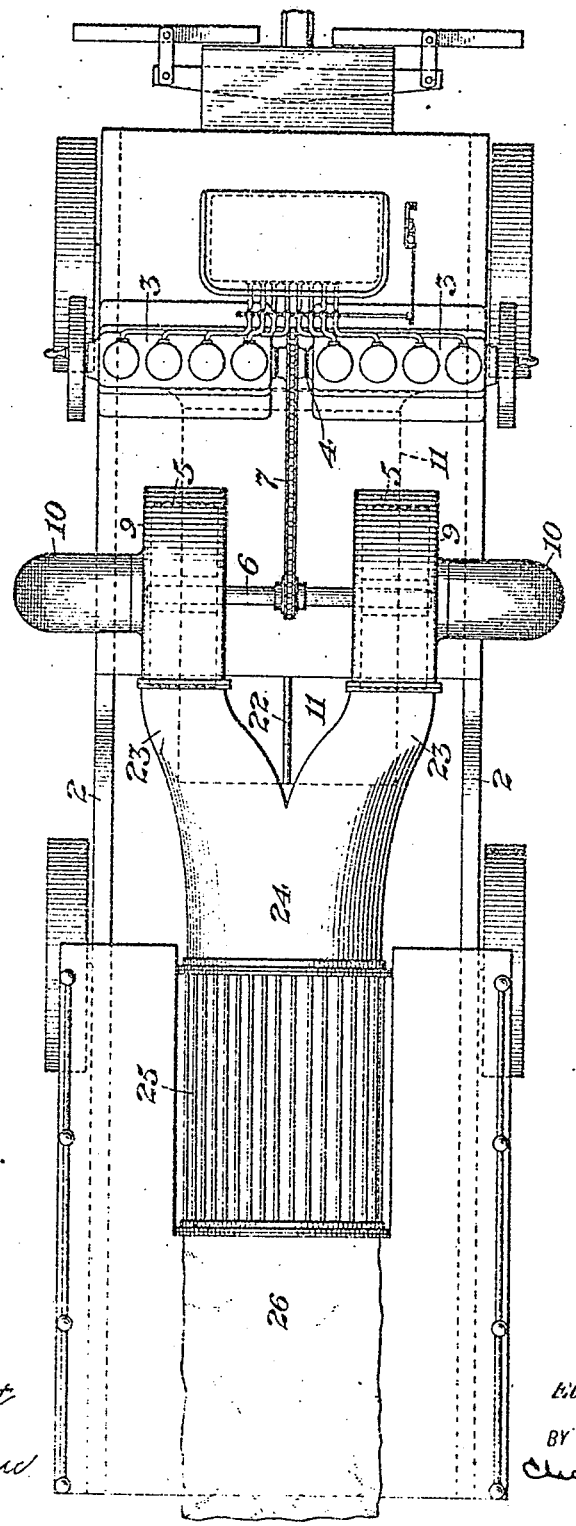

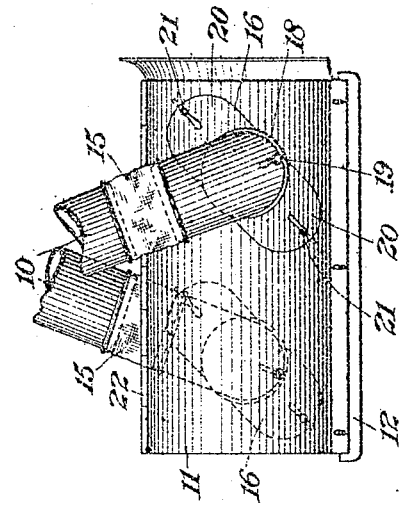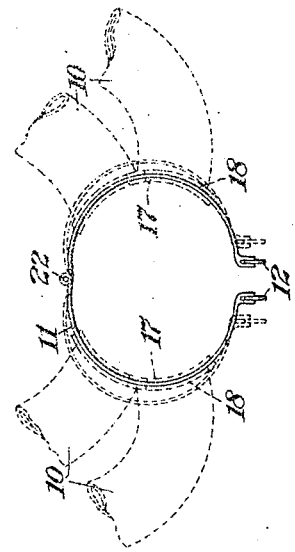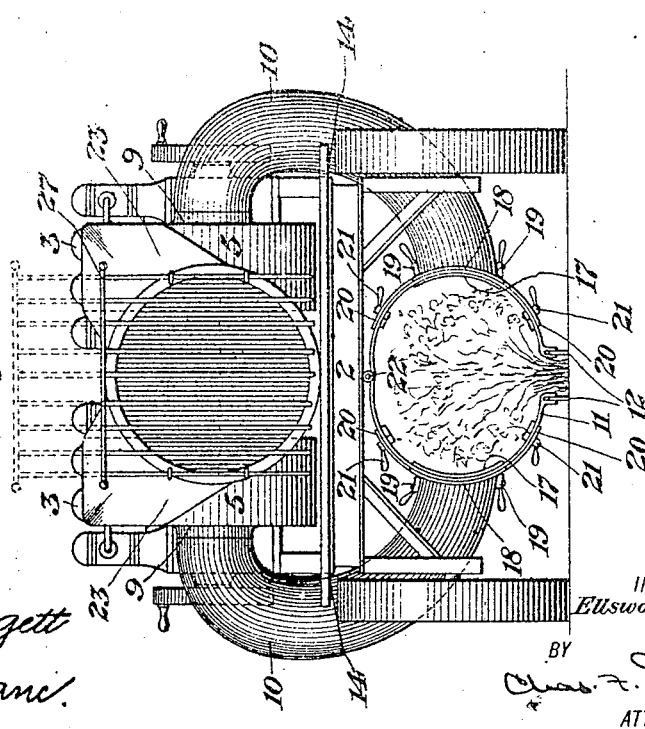

UNITED STATES PATENT OFFICE.

ELLSWORTH CHILDS, OF NEW YORK, N. Y.

COTTON-HARVESTER.

949,260.     Specification of Letters Patent.     Patented Feb. 15, 1910.

Application filed November 30, 1908. Serial No. 465,226.

*To all whom it may concern:*

Be it known that I, ELLSWORTH CHILDS, citizen of the United States, and resident of New York, in the county of New York and State of New York, have invented certain new and useful Improvements in Cotton-Harvesters, of which the following is a specification.

The present invention relates to cotton harvesters of the pneumatic type, and has for its main object the production of a harvester of such type that will be simple in construction and effective in operation.

In the growth of cotton, as is well known, the cotton ripens first at the bottom of the stands and then ripens gradually from such point toward the top of the stands as the season advances, and as such gradual ripening consumes some considerable period of time, the picking of the cotton is usually effected at several different operations.

To provide a harvester specially adapted to meet such conditions has therefore been a further object in my present invention, and to this end the harvester will be provided with means adapted for effectively removing the cotton from the stands at whatever parts thereon it may be ripe and without in any way disturbing the green or unripe cotton.

Further objects and advantages of my invention will be hereinafter referred to in the detailed description of the invention which follows.

In order that the invention may be clearly understood by those skilled in the art, I have illustrated in the accompanying drawings one simple embodiment of my invention, and in said drawings,—

Figure 1 is a side elevation of a cotton harvester made in accordance with my improvements. Figs. 2 and 3 are plan and rear end views, respectively, of the same. Figs. 4 and 5 are detail views of parts of the harvester to which reference will be made hereinafter.

Referring to the drawings by numerals, like numerals indicating like parts in the various views, 2 denotes the frame which may be of any desired construction, the said frame being mounted on a suitable running gear and adapted to be propelled in any suitable or desired manner. Mounted upon the said frame 2 is a high-power motor 3 of any suitable type, an eight-cylinder explosive motor being conventionally shown, and the said motor through its power shaft 4 engages and drives two fans or blowers 5, 5, of any desired type (preferably Sturtevant blowers) and arranged preferably as shown, one at each side of the longitudinal center of the harvester upon a transversely arranged shaft 6 which is operatively connected with the said motor shaft 4 through the medium of a drive belt 7. Each fan-casing 9 communicates by means of a suitable conduit 10 with the picking hood 11 at the under side of the vehicle frame, the said hood in the present case shown having the form of an open-ended arch of approximately the same height as the ordinary stand of cotton and being open at its bottom and adapted to inclose a cotton stand as the harvester is drawn across the field with the hood straddling the row of cotton stands. The hood 11 may be operatively connected with the harvester in any suitable manner, but in order that it may follow the inequalities of the ground, I preferably provide it with adjustably connected shoes or runners 12 for resting and moving upon the ground, and loosely suspend it from the frame 2 by flexible connections 13, a suitable flexible joint being provided in the conduits 10 to provide for the rise and fall or other movement of the hood as the harvester traverses over the ground. The said flexible joint in the conduits 10 may be provided in any suitable manner, such as by a slip-joint 14 as indicated in Figs. 1 and 3, or by interposing a flexible connection 15 in the conduits, as indicated in Fig. 4.

As an important feature of my present invention, the hood conduits 10 connect with the hood at the sides thereof, and such connection is adjustable whereby the intake ends of the conduits may be raised or lowered to bring them opposite or adjacent to those parts of the stands bearing the ripened cotton, which parts, as before stated, vary according to the season. In this way the ripened cotton may be removed from the stands without interfering in any way with the unripened cotton. Furthermore, the intake ends of the conduits being at the sides of the hood and in a substantially horizontal position when adjusted to the lower part thereof as indicated by dotted lines in Fig. 5, thereby causes the draft of the intake suction to be directed in a lateral or substantially horizontal direction and so avoid liability of drawing dirt or similar foreign matter from the ground into the conduit with the cotton. Also, in order to avoid the suction draft of one conduit interfering with that of the other, the intake ends of the conduits are preferably located in non-opposite positions as shown in Fig. 4.

The adjustable connection of the conduits with the hood may be effected in any suitable or desired way. As shown in the drawings the hood is provided at each side thereof with an elongated slot 16 through which the connecting end of the conduit is passed and provided with a flange 17 for engaging the inner side of the hood, while a collar 18 is loosely fitted on the conduit for engagement with the outer side of the hood, the said flange 17 and collar 18 being adapted to coöperate for clamping engagement with the hood for the purpose of securing the conduits in adjustable position, by means of a cam-lever 19 on the conduit engaging the collar 18. As the position of the conduits in the slot 16 is adjusted, the slots will preferably be closed by suitable means, such as the removable plates 20 having hood-engaging clamping levers 21.

As a further and important feature of my invention, the hood 11 is formed in two longitudinal sections so supported as to have a tendency to move inwardly or toward each other and thereby closely embrace the cotton stands and bring the intake ends of the conduits in close relation therewith whereby the suction action of said conduits will be rendered more effective. Such movement of the hood sections is obtained in the present case by hinging said sections together at their upper ends, as at 22, whereby their lower ends will have a tendency to gravitate toward each other, as indicated in Fig. 5.

The hood 11 through its connected conduits 10, 10, delivers to the fan-casings 9, 9, and said fan-casings at their rear ends deliver to the branching pipes 23, 23, of a conduit 24 through which the cotton passes to a cleaning and exhaust cage 25 at one end of said conduit. This cage 25 in the present instance is shown as made up of rods spaced apart a suitable distance, and at its rear end the said cage is so constructed as to receive any suitable receptacle, as a bag 26, to which the cotton is delivered by the fan-blast.

The operation of the harvester described thus far, is as follows: The harvester will be drawn over the field following the cotton stands and the suction hood 11 depending beneath the vehicle frame will straddle and embrace the stands as the harvester traverses the field. As the plant is embraced and inclosed by the hood the suction produced therein will disengage the bolls of ripe cotton and they will pass up through the hood conduits into the fan-casings, from which casings they will be delivered through the flaring delivery conduit to the cleaning cage, and thence to the bag or receptacle in which the cotton is delivered.

It will be seen that all foreign matter which is taken up by the powerful suction in the hood will be entirely eliminated when the cotton, under the influence of the blast, is carried back into and through the cleaning cage 25, so that the bolls in prime condition, effectively separated from twigs, dirt and the like, will be delivered to the bag or receptacle.

The open cage 25, in addition to permitting of the elimination of all dirt and foreign matter from the cotton during the passage of the latter through said cage, is also intended to permit of the exhaust of the air blast in advance of the cotton-receiving bag or receptacle, for it will be understood that if such exhaust were not provided for, the blast from the conduit 24 would blow or force the bag from its connection.

In order to permit of the removal of the bag or the substitution of an empty bag for a filled one during the operation of the harvester without loss or discharge of the cotton from the cage 25, I prefer to provide a suitable gate at the rear end of the cage, such for example as shown at 27, which is slidably connected to the cage and adapted to be open when a bag is in position and be closed when the bag is removed, or when one bag is being substituted for another.

What I claim is:

1. In a machine of the class described, a wheeled supporting frame, a suction apparatus carried thereby, a plant-inclosing suction hood, and a conduit leading from the side of said hood to the suction apparatus, said conduit having an adjustable connection with said hood for movement to different parts thereof.

2. In a machine of the class described, a wheeled supporting frame, a suction apparatus carried thereby, a plant-inclosing suction hood, and conduits leading from the opposite sides of said hood to the suction apparatus, said conduits each having an adjustable connection with said hood for movement to different parts thereof.

3. In a machine of the class described, a wheeled supporting frame, a suction apparatus carried thereby, a plant-inclosing suction hood, and a conduit leading from the side of said hood to the suction apparatus, said conduit having a vertically adjustable connection with said hood.

4. In a machine of the class described, a wheeled supporting frame, a suction apparatus carried thereby, a plant-inclosing suction hood, and conduits leading from the opposite sides of said hood to the suction apparatus, said conduits each having a vertically adjustable connection with said hood.

5. In a machine of the class described, a wheeled supporting frame, a suction apparatus carried thereby, a plant-inclosing suction hood, and conduits leading from opposite sides of said hood at non-opposite positions to the suction apparatus.

6. In a machine of the class described, a wheeled supporting frame, suction apparatus carried thereby, an arch-shaped plant-inclosing hood formed in two longitudinal sections pivotally supported for lateral movement relative to each other, and conduits leading from said hood sections to the suction apparatus.

7. In a machine of the class described, a wheeled supporting frame, suction apparatus carried thereby, an arch-shaped plant-inclosing hood formed in two longitudinal sections hinged together at their upper side to permit of lateral movement relative to each other, and conduits leading from said hood sections to the suction apparatus.

8. In a machine of the class described, a wheeled supporting frame, suction apparatus carried thereby, an arch-shaped plant-inclosing hood formed in two longitudinal sections supported for lateral movement relative to each other, and conduits leading from said hood sections to the suction apparatus, said conduits having an adjustable connection with said hood sections for movement to different parts thereof.

Signed at New York, in the county of New York, and State of New York, this 24th day of November A. D. 1908.

ELLSWORTH CHILDS.

Witnesses:
 CHAS. F. DANE,
 J. B. LE BLANC.